(12) United States Patent
Kato et al.

(10) Patent No.: US 7,015,303 B1
(45) Date of Patent: *Mar. 21, 2006

(54) POLYKETONE SOLUTION

(75) Inventors: Jinichiro Kato, Nobeoka (JP); Toru Morita, Nobeoka (JP); Kiyoshi Fujieda, Nobeoka (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/744,884

(22) PCT Filed: Aug. 5, 1999

(86) PCT No.: PCT/JP99/04235

§ 371 (c)(1),
(2), (4) Date: Jan. 31, 2001

(87) PCT Pub. No.: WO00/09611

PCT Pub. Date: Feb. 24, 2000

(30) Foreign Application Priority Data

Aug. 10, 1998 (JP) .................................. 10-236595
Mar. 17, 1999 (JP) .................................. 11-072091

(51) Int. Cl.
*C08G 2/16* (2006.01)
*C08G 18/08* (2006.01)
*C08K 5/17* (2006.01)

(52) U.S. Cl. .............. 528/220; 524/106; 524/115; 524/122; 524/154; 524/177; 524/236; 524/368; 524/392; 524/400; 524/401; 528/220; 528/392; 528/488; 528/491

(58) Field of Classification Search .............. 524/236, 524/368, 400, 106, 115, 122, 154, 144, 4.01, 524/392
See application file for complete search history.

(56) References Cited

U.S. PATENT DOCUMENTS

| | | | |
|---|---|---|---|
| 5,045,258 A | 9/1991 | van Breen et al. | 264/85 |
| 5,066,701 A | 11/1991 | George et al. | 524/417 |
| 5,194,210 A | 3/1993 | Lommerts et al. | 264/184 |
| 5,281,692 A | 1/1994 | Rutten | 528/392 |
| 5,407,982 A | 4/1995 | Ash | 524/106 |
| 5,475,083 A | 12/1995 | de Haas et al. | 528/491 |
| 5,552,218 A | 9/1996 | Maat et al. | 428/357 |
| 5,820,806 A | 10/1998 | Cloos et al. | 264/203 |
| 5,955,019 A | 9/1999 | Ash | 264/203 |

FOREIGN PATENT DOCUMENTS

| | | |
|---|---|---|
| EP | 0 478 088 A1 | 4/1992 |
| JP | 2-112413 | 4/1990 |
| JP | 4-228613 | 8/1992 |
| JP | 4-505344 | 9/1992 |
| JP | 7-508317 | 9/1995 |
| JP | 8-507328 | 8/1996 |
| JP | 09324377 | 12/1997 |
| TW | 174835 | 12/1991 |
| WO | WO 92/10524 | 6/1992 |
| WO | WO 94/20562 | 9/1994 |
| WO | 99/18143 | 4/1999 |

*Primary Examiner*—Terrel Morris
*Assistant Examiner*—Victor S. Chang
(74) *Attorney, Agent, or Firm*—Finnegan, Henderson, Farabow, Garrett & Dunner, L.L.P.

(57) ABSTRACT

A solution of a polyketone as a copolymer of carbon monoxide and one or more olefins, wherein 90 wt % or more of said copolymer comprises carbon monoxide units and olefin units, and a solvent is an aqueous solution of at least one member selected from the group consisting of zinc salts, calcium salts, thiocyanates and iron salts.

4 Claims, No Drawings

POLYKETONE SOLUTION

TECHNICAL FIELD

The present invention relates to a polyketone solution, fiber obtained by the use of the polyketone solution, and a process for producing the fiber. More particularly, the present invention relates to a polyketone solution that has a low toxicity, is excellent in incombustibity, spinning stability and solvent recoverability and is inexpensive, and a wet spinning process using said solution, and fiber obtained by said process.

BACKGROUND ART

In recent years, it has become possible to obtain a polyketone comprising a substantially alternating copolymer of carbon monoxide and an olefin such as ethylene or propylene by polymerizing carbon monoxide with said olefin by using a transition metal complex of palladium, nickel or the like as a catalyst (Kogyo-zairyo, the December number, page 5, 1997). A large number of investigators have investigated the application of polyketones as fiber for industrial materials, and it is expected that the polyketones will be utilized as fiber for composite materials, such as reinforcing fiber for tire cords, belts and the like, and reinforcing fiber for concrete, by taking advantage of the high strength, high modulus of elasticity, high-temperature dimensional stability, adhesive properties and creep resistance of the polyketones.

Since the polyketones are easily crosslinked by heat when melted, wet spinning is preferably employed for producing fiber from the polyketone. In particular, polyketones obtained substantially from only carbon monoxide and ethylene (poly(1-oxotrimethylene)s; hereinafter abbreviated as ECO) which can exhibit excellent mechanical properties is easily crosslinked by heat and hence is very difficult to melt-spun, so that fiber thereof can be obtained substantially only by wet spinning.

As a solvent used in the wet spinning of the polyketone, there are known hexafluoroisopropanol, phenolic solvents such as m-cresol, resorcinol/water, etc., and organic solvents such as resorcinol/carbonate, etc. All of these solvents, however, involve serious problems when used for conducting the wet spinning industrially.

For example, JP-A-2-112413 and Japanese Patent Application Kohyo No. 4-505344 disclose wet spinning processes of aliphatic polyketones and the employment of any of hexafluoroisopropanol, m-cresol and a mixture thereof as a solvent. In particular, Japanese Patent Application Kohyo No. 4-505344 discloses that as to characteristics of solvents including the above solvents, solvents having a dipole moment of $3 \times 10^{-30}$ to $9 \times 10^{-30}$ coulomb·meter and a Hildebrand solubility parameter of 16 to 27 $MPa^{-1/2}$ can be used as a solvent for the polyketones. Hexafluoropropanol, however, cannot be industrially used for the following reasons: it is so expensive that its industrial employment is utterly unprofitable even when a trifling loss of hexafluoropropanol in its recovery is considered; and hexafluoropropanol has a high toxicity and a low boiling point, so that a completely closed spinning equipment should be used. On the other hand, m-cresol can be used as a solvent for the aliphatic polyketones, but it should be used in combination with hexafluoro-isopropanol because of its low dissolving power and it has a high toxicity and a strong odor of phenol, so that a completely closed spinning equipment should be used.

Moreover, fiber obtained by using any of the above solvents has unsatisfactory mechanical properties, and the production of fiber from a solution containing any of the above solvents becomes difficult at a rapid spinning rate in some cases because the rate of desolvation from the solution is too slow.

JP-A-4-228613, Japanese Patent Application Kohyo No. 7-508317 and Japanese Patent Application Kohyo No. 8-507328 disclose the employment of a solvent comprising at least one aromatic alcohol, and mention resorcinol/water, phenol/acetone, hydroquinone/propylene carbonate, and resorcinol/propylene carbonate as specific examples of the solvent. These aromatic alcohols, however, have a high toxicity and a strong odor of phenol, so that a completely closed spinning equipment should be used. Furthermore, when a combustible organic solvent is used in combination with them as a co-solvent, an explosion-proof equipment is necessary. In addition, since the solubility of ECO in the mentioned solvents is not always sufficient, the polymer concentration in the resulting dope cannot be increased, so that the attainment of a high strength is difficult. In the case of resorcinol/water, the desolvation rate is too slow when coagulation using water is carried out, and hence methanol should be used as a coagulation bath, so that expensive and complicated spinning equipment and solvent-recovering equipment should be used.

A problem to be solved by the present invention is to provide a polyketone solution not obtained by the use of the well-known solvent for polyketone described above, i.e., a polyketone solution which has a low toxicity, is excellent in incombustibity, spinning stability and solvent recoverability, is inexpensive, and can be industrially subjected to wet spinning; a process for producing polyketone fiber by subjecting said polyketone solution to wet spinning; and polyketone fiber.

DISCLOSURE OF THE INVENTION

The present inventors conducted an intensive investigation on the solubility of polyketones in various solvents in order to solve the above problem, and consequently found that the polyketones are soluble in an aqueous solution containing one or more specific salts strictly limited in kind, though the polyketones are hydrophobic. As a result of further investigation, the present invention has been accomplished.

That is, the present invention relates to a solution of a polyketone as a copolymer of carbon monoxide and one or more olefins, wherein 90 wt % or more of said copolymer comprises carbon monoxide units and olefin units, and a solvent is an aqueous solution of at least one member selected from the group consisting of zinc salts, calcium salts, thiocyanates and iron salts; a process for producing polyketone fiber by using the polyketone solution; and polyketone fiber.

BEST MODE FOR CARRYING OUT THE INVENTION

The polyketone used in the present invention is a copolymer 90 wt % or more of which comprises carbon monoxide units and olefin units. Here, the carbon monoxide unit refers to a carbonyl group formed by the reaction of carbon monoxide, and the olefin unit refers to an alkylene group formed by the reaction of the olefin. Therefore, the polyketone used in the present invention is a polymer 90 wt % or more of which comprises carbonyl groups and alkylene groups. The hydrogen atom of the alkylene group may be replaced by a hydroxyl group, carboxyl group, ester group, ether group, halogen atom or the like. The polyketone may comprise units other than ketones so long as the proportion of these units is less than 10 wt %. Although the carbon monoxide units and the olefin units may be arranged either randomly or alternately, a polyketone obtained by alternating copolymerization of carbon monoxide and the olefin and represented by the structural formula (1) is especially preferable because it is excellent in strength, modulus of elasticity, adhesive properties, dimensional stability, creep resistance and light resistance as fiber:

Structural Formula (1)

$$\mathrm{-(A-\underset{\underset{O}{\|}}{C})_n-}$$

Formula (2)

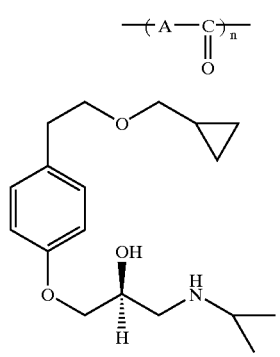

wherein A is an alkylene group.

That is, the preferable polyketone of the structural formula (1) is a polymer in which carbonyl groups derived from carbon monoxide and alkylene groups derived from the olefin are alternately arranged. In this polymer, there may be portions in which carbonyl groups or alkylene groups are connected to one another, though the following polyketone is preferable for improving the heat resistance and the light resistance: a polyketone 95 wt % or more of which is a completely alternating copolymer of carbon monoxide and the olefin, i.e., a copolymer in which alkylene groups and carbonyl groups are bonded together so that a carbonyl group may be next to an alkylene group and that another alkylene group may be next to the carbonyl group. Needless to say, the content of portions composed of the completely alternating copolymer of carbon monoxide and the olefin in the polymer is preferably as high as possible and is preferably 97 wt % or more, most preferably 100 wt %.

The polyketone used in the present invention may be either a copolymer of carbon monoxide and an olefin, or a copolymer of carbon monoxide and two or more olefins. Specific examples of the olefin used are ethylene, propylene, butene, pentene, hexene, heptene, octene, nonene, decene, dodecene, styrene, methyl acrylate, methyl methacrylate, vinyl acetate, undecenoic acid, undecenol, 6-chlorohexene, N-vinylpyrrolidone, etc. As the polyketone obtained by using one or more of these olefins, a polyketone substantially consisting of units formed by alternating copolymerization of only carbon monoxide and ethylene is the most preferable because it has a high strength, a high modulus of elasticity and an excellent high-temperature dimensional stability. The following polyketone is preferable because of its especially high solubility in the solvent used in the present invention: a polyketone comprising a mixture of units formed by alternating copolymerization of carbon monoxide and ethylene and units formed by alternating copolymerization of carbon monoxide and propylene which polyketone contains propylene units in a proportion of 0.1 to 10 mol %, preferably 4 to 8 mol %, based on the total amount of olefin units constituting the polyketone.

The polyketone may contain additives such as antioxidants, anti-gelling agents, delustering agents, flame retardants, ultraviolet absorbers, fluorescent whitening agents, metal soaps, etc., depending on purposes.

As a process for producing the polyketone used in the present invention, a well-known process can be used as it is or after modification. The polyketone used in the present invention can be synthesized, for example, by copolymerizing carbon monoxide with one or more olefins selected from ethylene, propylene and the like, in the presence of a catalyst comprising at least one compound of a transition metal in group VIII such as palladium, nickel or cobalt, a phosphorus-containing bidentate ligand represented by the structural formula (2) and anions of an acid having a pKa of 4 or less:

$R^1R^2P\text{—}R\text{—}PR^3R^4$    Structural formula (2)

wherein $R^1$, $R_2$, $R^3$ and $R^4$, which may be the same or different, are organic groups having 1 to 30 carbon atoms, and R is an organic group having 2 to 5 carbon atoms.

The transition metal in group VIII includes palladium, nickel, cobalt, iron, rhodium, ruthenium, osmium, iridium, platinum, etc. From the viewpoint of activity for polymerization, palladium, nickel and cobalt are preferable, and palladium is especially preferable. As the catalyst, the transition metal is preferably used in the form of a carboxylate, in particular, acetate.

In the phosphorus-containing bidentate ligand of the structural formula (2), each of $R^1$, $R^2$, $R^3$ and $R^4$ is preferably an unsubstituted phenyl group, or at least one of $R^1$, $R^2$, $R^3$ and $R^4$ is preferably a phenyl group containing one or more alkoxy groups introduced thereinto at the ortho position in relation to the phosphorus atom bonded to the phenyl group. R connecting the two phosphorus atoms is preferably a trimethylene group. The acid having a pKa of 4 or less includes trifluoroacetic acid, difluoroacetic acid, trichloroacetic acid, p-toluenesulfonic acid, etc.

A specific example of process for producing the polyketone used in the present invention is described below.

The polymerization is carried out by adding the catalyst comprising at least one compound of a transition metal in group VIII such as palladium, nickel or cobalt, a phosphorus-containing bidentate ligand of the structural formula (2) and anions of an acid having a pKa of 4 or less to a lower alcohol such as methanol or ethanol to obtain a solution, and introducing carbon monoxide and one or more olefins into the solution. The molar ratio of carbon monoxide to the olefin(s) is preferably 5:1 to 1:2. In the compound of a transition metal in group VIII used as the catalyst, the amount of the metal element is preferably $10^{-8}$ to 0.1 mol per mol of the olefin(s) used in the polymerization, from the viewpoint of catalytic activity. For achieving the object of the present invention, it is especially preferable to adjust the amount of the compound(s) of a transition metal in group VIII charged, so that palladium, nickel and cobalt may be contained in the resulting polyketone in a total amount of only 100 ppm or less. The phosphorus-containing bidentate ligand of the structural formula (2) is preferably used in an amount of 0.1 to 20 mols, more preferably 1 to 3 mols, per mol of the compound(s) of a transition metal in group VIII from the viewpoint of activity for polymerization. The amount of the acid having a pKa of 4 or less is preferably 0.01 to 150 equivalents, in particular, 1 to 50 equivalents, per gram atom of the compound(s) of a transition metal in group VIII. The polymerization is preferably carried out at 50 to 150° C. and at a pressure of 4 to 10 MPa for usually 10 minutes to 20 days. In order to maintain the catalytic activity during the polymerization and improve the heat resistance of the resulting polyketone, a quinone such as 1,4-benzoquinone, 1,4-naphthoquinone or the like may be added in an amount of 0.1 to 100 mols per mol of the catalyst metal element(s).

The polyketone-containing composition thus obtained is filtered, and the residue is washed to remove the catalyst, the quinone and the like, followed by drying and isolation.

The polyketone may be produced also by so-called gas phase polymerization by supporting the above-mentioned catalyst on a polymer, inorganic powder or the like. This process is a rather preferable process because the catalyst hardly remains in the polyketone when the process is adopted.

The polyketone thus obtained is subjected to elemental analysis or the like to measure the amounts of palladium, nickel and cobalt elements contained in the polyketone. When the total amount of the elements is 100 ppm or less, the polyketone can be subjected as it is to the spinning step described hereinafter. However, when the total amount is more than 100 ppm, it is recommendable to carry out a procedure for reducing the total amount of palladium, nickel and cobalt contained in the polyketone. Although a method for reducing the total amount of these metals is not particularly limited, it includes, for example, a method of repeatedly washing the obtained polyketone 1 to 20 times to reduce the total amount of palladium, nickel and cobalt to 100 ppm or less, and another method in which the polyketone is dispersed in a solvent and the metals are dissolved by introducing carbon monoxide or a phosphorus-containing ligand into the dispersion to form metal-carbonyl complexes or metal-phosphorus complexes. The solvent used in either of the above methods includes, for example, alcohols such as methanol, ethanol, propanol, etc.; ethers such as dioxane, tetrahydrofuran, diethyl ether, etc.; ketones such as acetone, methyl ethyl ketone, etc.; and hydrocarbons such as pentane, hexane, petroleum ether, etc. Although the washing temperature is not particularly limited, it is, for example, 0 to 80° C. Although the washing time is also not particularly limited, a time required for one run of washing is, for example, 10 seconds to 1 hour. After the washing procedure is thus carried out, the amounts of palladium, nickel and cobalt are measured again. When the total amount of these metals is 100 ppm or less, the polyketone can be subjected to a spinning step.

The polyketone solution of the present invention is a solution of a polyketone as a copolymer of carbon monoxide and one or more olefins, wherein 90 wt % or more of said copolymer comprises carbon monoxide units and olefin units, and a solvent is an aqueous solution of at least one member selected from the group consisting of zinc salts, calcium salts, thiocyanates and iron salts. Here, the solution is an aqueous solution containing the salt(s) which contains the polyketone dissolved therein, and the solvent is an aqueous solution containing the salt(s) dissolved therein which is intended for dissolving the polyketone. The Hildebrand solubility parameter of each of these solutions is 47 $MPa^{-1/2}$ or more. As the zinc salts, calcium salts, thiocyanates and iron salts, those having a solubility in water of 30 wt % or more, preferably 50 wt % or more, are preferable. Specific examples of the zinc salts are zinc chloride, zinc bromide, zinc iodide, zinc nitrate, zinc sulfate, zinc chlorite, etc. Specific examples of the calcium salts are calcium bromide, calcium iodide, calcium chloride, etc. Specific examples of the thiocyanates are zinc thiocyanate, aluminum thiocyanate, ammonium thiocyanate, calcium thiocyanate, potassium thiocyanate, magnesium thiocyanate, sodium thiocyanate, barium thiocyanate, etc. Specific examples of the iron salts are iron bromide, iron iodide, iron chloride, etc. Of these salts, zinc chloride, zinc bromide, zinc iodide and calcium bromide are preferable from the viewpoint of the solubility of the polyketone, the cost of the solvent and the stability of the aqueous solutions. Zinc chloride is especially preferable.

A plurality of salts may be incorporated into the polyketone solution of the present invention for the purpose of, for example, improving the solubility, reducing the material cost, and improving the stability of the polyketone solution. The incorporation is a rather preferable method because it improves the solubility. The polyketone solution may contain other inorganic substances and organic substances so long as they do not defeat the object of the present invention. The polyketone solution may contain, for example, polymers other than the polyketone and/or organic substances. Although the content of the other inorganic substances and organic substances is not particularly limited, it is usually 70 wt % or less.

The water used in the solution is not particularly limited so long as it can be industrially used. As the water, any of drinking water, river water, ion-exchanged water, etc. may be used. In addition, the water may contain organic solvents such as methanol, ethanol, ethylene glycol, acetone, dimethyl sulfoxide, N-methylpyrrolidone, etc. in a proportion of usually 50 wt % or less so long as the organic solvents do not reduce the ability to dissolve the polyketone.

The concentration of the salt(s) selected from the group consisting of the zinc salts, calcium salts, thiocyanates and iron salts, in the solvent used in the polyketone solution of the present invention is 5 to 85 wt %, preferably 30 to 85 wt %, more preferably 45 to 75 wt %, still more preferably 67 to 75 wt %, for attaining sufficient dissolving properties. The concentration of the salt(s) referred to here is a value defined by the equation described below. In the equation, weight of solvent refers to the weight of an aqueous solution containing the salt(s) but not the polyketone.

Concentration of salt(s) (wt %)=(weight of salt(s)/weight of solvent)×100

As the solvent used in the present invention, an aqueous solution of one or more zinc halides is the most excellent solvent for the polyketone because of its high dissolving properties. However, when an aqueous solution containing only one or more zinc halides as the salt(s) is used as a solvent for the polyketone, the viscosity of the resulting polymer solution tends to be too high. Therefore, when the polymer concentration is increased, defoaming becomes difficult or expensive and special extruder and dissolving apparatus for preparing a high-viscosity solution are necessary in some cases. In addition, when the polymer solution is coagulated by passage through an aqueous coagulation bath, the coagulation product containing water has a low strength and hence tends to undergo end breakage. Furthermore, when the polyketone is dissolved in an aqueous solution of one or more zinc halides, the resulting solution is yellowish and the degree of its coloring becomes higher with time. Such coloring of the polyketone solution results in coloring of fiber and hence causes a decrease of the quality level of the resulting fiber.

Such problems can be solved by adding a specific water-soluble salt to an aqueous solution of one or more zinc halides. That is, as the solvent, there is used an aqueous solution containing at least one zinc halide and at least one metal salt which is other than said zinc halide(s) and is soluble in water at 50° C. in a proportion of 1 wt % or more.

Here, the metal salt which is other than the zinc halide(s) and is soluble in water at 50° C. in a proportion of 1 wt % or more is not particularly limited so long as it is other than the zinc halide(s) and is soluble in water at 50° C. in a proportion of 1 wt % or more. The metal salt may be any of inorganic salts (e.g. halides, sulfates, phosphates and nitrates) and organic salts (e.g. acetates, formates and sulfonates) of typical metal elements or transition metal elements. Metal halides other than the zinc halide(s) are preferable because they are advantageous in that their recovery is easy when their anionic element is the same as that of the zinc halide(s). As to the kind of the metal, alkali metal halides and alkaline earth metal halides are preferable because a polymer solution obtained by using any of them has a markedly reduced viscosity. In this case, for facilitating the recovery of the other metal salt(s), the same halogen as that used in the zinc halide is preferably used as the anion of the other metal salt(s), and chlorides are especially preferable. Preferable specific examples of the other metal salt are sodium chloride, calcium chloride, lithium chloride, barium chloride, sodium bromide, calcium bromide, lithium bromide, barium bromide, sodium iodide, calcium iodide, lithium iodide, barium iodide, etc. In particular, sodium chloride, calcium chloride and barium chloride are preferable and sodium chloride and calcium chloride are especially preferable, from the viewpoint of the degree of decrease in viscosity of the polymer solution, spinning stability, the low degree of coloring of the resulting fiber, ease of recovery, the stability of the metal salt(s), and cost. A plurality of metal salts may be used in combination, according to the definition "at least one metal salt".

The content of the at least one zinc halide in the solvent is preferably 5 to 75 wt %, more preferably 20 to 70 wt %, most preferably 45 to 70 wt %, for attaining good dissolving properties. Alternatively, the ratio of the zinc halide(s) to the at least one metal salt which is other than said zinc halide(s) and is soluble in water at 50° C. in a proportion of 1 wt % or more is preferably 98/2 to 20/80, more preferably 90/10 to 66/34, for suppressing the decrease in viscosity of the polymer solution and its coloring. The at least one zinc halide and the at least one metal salt which is other than said zinc halide(s) and is soluble in water at 50° C. in a proportion of 1 wt % or more may react with each other in the solution. For example, when zinc chloride and sodium chloride are used, a zinc tetrachloride complex is formed depending on dissolution conditions. Such a state may be brought about.

The polyketone concentration in the polyketone solution of the present invention is preferably 0.005 to 70 wt %. A polyketone concentration of less than 0.005 wt % is too low and hence is disadvantageous in that the solution is difficult to make into fiber at the time of coagulation and that the production cost of fiber is too high. When the polyketone concentration is more than 70 wt %, the Polyketone is not dissolved any more in the solvent. The polyketone concentration is preferably 0.5 to 40 wt %, more preferably 1 to 30 wt %, from the viewpoint of solubility, ease of spinning and the production cost of fiber. The polyketone concentration referred to here is a value defined by the following equation:

Polymer Polyketone concentration (wt %)=(weight of polyketone/(weight of polyketone+weight of solvent))×100

The polyketone solution of the present invention can be produced by adding a polyketone as a copolymer 90 wt % or more of which comprises carbon monoxide units and olefin units, to an aqueous solution containing at least one member selected from the group consisting of zinc salts, calcium salts, thiocyanates and iron salts, with stirring all at once or in several portions, and then continuing the stirring to effect substantially complete dissolution. Although the form of the polyketone is not particularly limited and may be any of powder, chips and the like, the polyketone is preferably in the form of powder because the dissolution rate of the powder is rapid and the powder contains only a small amount of a crosslinked product produced by heat during polymerization.

Although the temperature at the dissolution is not particularly limited, it ranges usually from 5 to 200° C., preferably from 30 to 150° C., from the viewpoint of dissolution rate and the stability of the solvent. Depending on the kinds and combination of the metals, the added metal salts themselves or a metal salt or complex produced by the reaction of two or more of the metal salts with one another is crystallized to be precipitated in some cases when the solvent is cooled. In such a case, it is important to carry out the dissolution and spinning at a temperature at which no crystals are precipitated. The dissolution is preferably carried out under reduced pressure so that the resulting polyketone solution may be free from air bubbles. Although the degree of vacuum is not particularly limited, the pressure is preferably 700 torr or less, more preferably 100 torr or less, most preferably 50 torr or less.

As a method for the dissolution, there can be adopted well-known methods such as stirring by the use of an agitating blade, stirring by the use of a single- or twin-screw extruder, stirring by the use of ultrasonic waves, etc.

The polyketone solution thus obtained is, if necessary, passed through a filter in order to remove foreign matters, a gelation product, a small amount of non-dissolved polymer, catalyst residues, etc., whereby a homogeneous solution is obtained.

The polyketone solution of the present invention is made into fiber excellent in strength and modulus of elasticity by wet spinning. In detail, high-performance fiber can be produced by extruding the polyketone solution of the present invention through a spinneret to obtain a fibrous material, removing a portion or the whole of the salt(s) from the fibrous material, and then stretching the fibrous material in a temperature range of 0 to 300° C.

As a method for removing the above-mentioned metal salt(s) from the fibrous material, there is preferably adopted, for example, a method of extruding the polyketone solution into a solvent having lower dissolving properties for the polyketone than does the solvent used in the present invention. As such a solvent having lower dissolving properties, metal salt solutions having a lower concentration than does the solvent used in the present invention are preferable. In particular, water, acidic aqueous solutions, alkali aqueous solutions and the like are preferably used. When the fibrous material is passed through a coagulating solvent, it is preferably passed therethrough while being pulled at a definite rate. In this case, although the rate is not particularly limited, it is usually 0.001 to 3,000 m/min.

The fiber obtained by thus removing the above-mentioned metal salt(s) is preferably subjected to a drying step in order to remove liquids represented by water. When dried, the water-containing fiber free from the above-mentioned metal salt(s) may be dried after winding-up, or it may be dried without winding-up and subjected to a stretching step as it is. The drying step is preferably carried out in an atmosphere of 10 to 300° C., and not only drying at a definite length but also optionally stretching or relaxation at a ratio of 1.1 to 10 may be carried out in the drying step. The fiber subjected to the drying step is subjected to a stretching step to become oriented yarn. The draw ratio is 1.1 or more, preferably 3 or more, more preferably 6 or more. The stretching can be conducted in one stage or two or more stages at a temperature of 0 to 300° C., preferably 150 to 300° C., for ease of the stretching.

A more preferable example of wet spinning process is as follows.

The polyketone solution of the present invention is, if necessary, passed through a filter in order to remove foreign matters, a gelation product, a small amount of non-dissolved polymer, catalyst residues, etc., and the thus treated solution is extruded through a spinneret and passed through a coagulation bath to make the polyketone into a fibrous material. The coagulation bath serves to remove a portion or the whole of the metal salt(s) from the polyketone solution to make impossible the dissolution of the polyketone in a solvent constituting the coagulation bath and allow the polyketone to maintain its fibrous form. As the solvent used as the coagulation bath, a solvent comprising 50 wt % or more of water is preferable because of its rapid desalting rate. For example, when an aqueous solution containing at least one zinc halide and at least one metal salt which is other than said zinc halide(s) and is soluble in water at 50° C. in a proportion of 1 wt % or more is used as the solvent for the polyketone, the solvent used as the coagulation bath is an aqueous solution containing water and less than 50 wt % of at least one zinc halide and/or at least one metal salt which is other than said zinc halide(s) and is soluble in water at 50° C. in a proportion of 1 wt % or more. Needless to say, this aqueous solution may contain organic solvents such as methanol, acetone, methyl ethyl ketone, etc., hydrochloric acid, hydrobromic acid, sulfuric acid, phosphoric acid and the like in a range of less than 50 wt %. Such solvents as the coagulation bath may be used as a mixture thereof if necessary. As the solvent used as the coagulation bath, water having a purity of substantially 100% or an aqueous solution containing 1 to 45 wt % of the same salt(s) as used in the solvent for the polyketone is especially preferable for removing the salt(s) used in the solvent for the polyketone from the fibrous material as much as possible. Although the temperature of the coagulation bath is not particularly limited, it is preferably 20° C. or higher, more preferably 40° C. or higher, still more preferably 50 to 95° C. The amount of the solvent used as the coagulation bath is preferably one time or more, more preferably 30 times or more, the amount of the polyketone discharged per hour.

If necessary, the fibrous material thus obtained by solidification may be washed at least once with water or an aqueous solution having a pH of 4 or lower. Such washing is a preferable method for dissolving the residual metal salt(s) not removable by the coagulation bath. Particularly when an aqueous zinc chloride solution is used as the solvent for the polyketone, dissolution of zinc chloride in water followed by dilution with water gives a zinc salt that is difficultly soluble in water. For removal of this zinc salt, it is very effective to further wash the fibrous material with a large volume of water, or to wash the fibrous material with preferably an aqueous solution having a pH of 4 or lower, such as an aqueous solution of hydrochloric acid, hydrobromic acid, sulfuric acid, phosphoric acid or the like. In order to improve the dissolving properties of such wash water for the difficulty water-soluble zinc salt, the temperature of the wash water is adjusted to 40° C. or higher, preferably 50 to 95° C.

In the coagulation and washing described above, the total content in the resulting fibrous material of at least one element selected for use from the group consisting of zinc, calcium and iron is preferably reduced to 10,000 ppm or less relative to dried fiber. This reduction is an important condition for improving the strength and modulus of elasticity of fiber finally obtained. The reason is that when the total content of the metal salt(s) used in the solvent for the polyketone is more than 10,000 ppm, stretching at a high ratio for attaining a high strength and a high modulus of elasticity is difficult in a subsequent stretching step.

The fibrous material thus freed of the salt(s) contains a large amount of water and hence is preferably dried at a temperature of 50° C. or higher to be freed of a portion or the whole of the water. As to a method for the drying, this fibrous material may be dried with stretching, or at a definite length, or with shrinking. Although the temperature at the drying may be set at any temperature, depending on a desired degree of drying, it is usually 50 to 250° C., preferably 50 to 150° C. As an apparatus for the drying, there may be used well-known apparatus such as tunnel dryers, roll heaters, net process type dryers, etc. The thus dried fiber is stretched at a ratio of 3 or more, preferably 6 or more, to become oriented yarn. The stretching is conducted in one stage or two or more stages at a temperature of preferably 50° C. or higher, more preferably 150 to 300° C., for ease of the stretching. It is preferable to apply a finishing agent at any stage between the drying and the stretching in order to smoothen the stretching by suppressing the friction between the fiber and a stretching machine and the generation of static electricity. As the finishing agent, well-known ones can be used.

The above-mentioned process for producing the polyketone fiber of the present invention is very effective when a step of recovering the salt(s) used in the solvent for the polyketone is taken into consideration. This is because the salt(s) used in the solvent for the polyketone can be reused in fresh solvent for the polyketone with almost no loss, by water removal even when diluted through the coagulation and washing steps. Needless to say, the loss of a portion of the salt(s) can be covered up by adding a necessary amount of the same salt(s) at the time of the reuse. That is, the following is possible: the coagulation bath containing at least 1 ppm of the salt(s) removed from the fibrous material, and a portion or the whole of the water or the aqueous solution having a pH of 4 or lower, which is used if necessary, are concentrated; a necessary amount of the same salt(s) as used in the solvent for the polyketone is added to the concentrated aqueous solution in order to cover up the loss of the salt(s); and the thus obtained aqueous solution is recycled to be reused as fresh solvent for the polyketone. For the concentration, the following well-known methods, for example, can be adopted without a particularly limitation: concentration by evaporation of water by heating, concentration using a ultrafiltration technique or an ion-exchange technique, and a method of making the salt(s) insoluble in the solvent therefor by neutralization or the like, filtering the thus treated solution, and then restoring the residue to the original salt structure(s).

The thus obtained polyketone fiber of the present invention is a polyketone fiber made of a compolymer 90 wt % or more of which comprises carbon monoxide units and olefin units, and the total content of palladium, nickel and cobalt elements in said fiber is preferably 100 ppm or less.

When the total content of these metal elements in the polyketone is more than 100 ppm, the following trouble is caused in some cases when the polyketone is dissolved in an aqueous solution containing at least one zinc halide: the polyketone is crosslinked by heat to increase the solution viscosity remarkably, so that spinning becomes impossible or that even if spinning is possible, characteristics of the resulting fiber change with spinning time because of gradual increase in the solution viscosity. Moreover, when heated, the resulting polyketone fiber tends to involve problems such as decreases in its strength, elongation, modulus of elasticity and molecular weight, and coloring. For preventing such problems, the total content of the metal elements is preferably reduced as much as possible. Specifically, the total content is preferably 50 ppm or less, more preferably 20 ppm or less, still more preferably 10 ppm or less.

In addition, the polyketone fiber of the present invention is a polyketone fiber comprising a copolymer of carbon monoxide and one or more olefins wherein 90 wt % or more of the copolymer comprises carbon monoxide units and olefin units, the total content of palladium, nickel and cobalt elements in the fiber is 100 ppm or less, and the total content in the fiber of at least one element selected for use from the group consisting of zinc, calcium and iron is preferably 10,000 or less. The at least one metal element is one that remains in the polyketone fiber without being completely removed from the aqueous metal salt solution used as the solvent for the polyketone. When the content of the metal element(s) is more than 10,000 ppm, the fiber is disadvantageous in that it is difficult to stretch, so that the its draw ratio is difficult to increase, resulting in a low strength and a low modulus of elasticity. Although the reason is not clear, it is conjectured that the stretching becomes difficult because the metal element(s) forms a crosslinkage between polymer molecules or inside a polymer molecule. The content of the metal element(s) is preferably as low as possible. For attaining a high draw ratio, the content of the metal element(s) is preferably 3,000 ppm or less, more preferably 2,000 ppm or less, still more preferably 200 ppm or less.

The thus obtained fiber containing only small amounts of catalyst residues and metal salt residues has, in particular, excellent dimensional stability and elastic modulus retention at high temperatures. The fiber has, for example, a storage elastic modulus at 180° C. of 80 g/d or more in the measurement of dynamic viscoelasticity at a frequency of 110 Hz. Poly(ethylene terephthalate) fiber and nylon 66 fiber which are often used as fiber for industrial material have a storage elastic modulus at 180° C. of 50 g/d or less as measured under the same conditions as in the case of the obtained fiber. This difference in storage elastic modulus is very important in the case of use at a high temperature. The storage elastic modulus at 180° C. of the obtained fiber is preferably 100 g/d or more, more preferably 150 g/d or more, most preferably 200 g/d or more, for attaining satisfactory physical properties even at a temperature higher than 180° C.

The intrinsic viscosity of the polyketone fiber of the present invention is preferably 0.3 or more. The reason is that when the intrinsic viscosity is less than 0.3, the molecular weight is too low, so that the improvement of the strength becomes difficult. The intrinsic viscosity is preferably 0.5 to 15, most preferably 2 to 13, in view of the strength, solubility and spinnable properties of the fiber obtained.

Although the fineness of the polyketone fiber of the present invention is not particularly limited, its single strand fineness is usually 0.01 to 10 d and its total fineness is usually 5 to 5,000 d. The polyketone fiber may be any of long fiber, short fiber, monofilament and multifilament.

The polyketone fiber of the present invention has characteristics such as a high strength, a high modulus of elasticity, a high adhesion, a high-temperature dimensional stability, excellent creep characteristics, solvent resistance, resistance to moist heat, etc., and contains only small amounts of catalyst residues (e.g. palladium, cobalt and nickel) and residues of the metal salt(s) used in the solvent for the polyketone, which accelerate the deterioration of the polyketone. Therefore, the polyketone fiber can be used as reinforcing fiber for fiber-reinforced composite materials such as fiber-reinforced rubbers (e.g. tires and belts), fiber-reinforced resins used in building materials, and fiber-reinforced resins used in building materials, automobiles, ships, sporting goods, etc. That is, when the amounts of the catalyst residues and the residues of the metal salt(s) used in the solvent for the polyketone are increased, the fiber is gradually deteriorated to lose its reinforcing effect, when used for a long period of time. When the polyketone fiber of the present invention containing the catalyst residues and the metal(s) in amounts not larger than specific amounts is used in the fiber-reinforced composite material, the fiber-reinforced material can exhibit its performance characteristics imparted by the exhibition of the excellent mechanical properties and thermal properties of the polyketone fiber, for a long period of time. As the proportion of the polyketone fiber used, 1 wt % or more based on the total weight of fibers used in the composite material is necessary for the exhibition of the performance characteristics. The proportion is preferably 20% or more, more preferably 50% or more.

For using the polyketone fiber of the present invention as tire cord, a well-known method can be adopted. When the polyketone fiber is used as tire cord, its single strand fineness is preferably 1 to 4 d and its total fineness is preferably 500 to 3,000 d. If necessary, the polyketone fiber may be used in admixture with other fibers such as rayon, polyester fiber, aramid fiber, nylon fiber, steel fiber, etc., though the polyketone fiber is preferably used in a proportion of 20 wt % or more, preferably 50 wt % or more, based on the total weight of tire cords contained in the tire, for the exhibition of the performance characteristics. The polyketone fiber obtained is doubled and twisted to be given a twist of 100 to 1,000 T/m, preferably 20 to 500 T/m, and then is made into tire fabric. Thereafter, a 10 to 30% RFL (phenol/formalin latex) liquid is adhered to the tire fabric, and the tire fabric is sealed at 100° C. or higher. The proportion of the RFL resin adhered is preferably 2 to 7 wt % based on the weight of the fiber. The tire cord thus obtained is especially useful as a carcass material for radial-ply tire. As a process for processing the obtained tire cord into tires, a well-known method can be adopted.

The present invention is illustrated in further detail with the following examples and the like, which should not be construed as limiting the scope of the invention.

Measuring methods for obtaining the measured values used in the explanations in the examples are as follows.

(1) Intrinsic Viscosity

Intrinsic viscosity [η] was calculated according to the following definition equation:

$$[\eta] = \lim_{c \to 0} (T - t)/(t \cdot C)$$

wherein t and T are times required for hexafluoro-isopropanol having a purity of 98% or more and a dilution of a polyketone with said haxafluoroiso-propanol, respectively, to flow through a viscosity tube at 25° C., and C is the weight of the solute per 100 ml of the aforesaid dilution which is expressed in gram unit.

(2) Amounts of Elements Such as Palladium, Nickel and Cobalt

Measured by ICP emission spectrometry by adopting a well-known method.

(3) Tenacity, Strength, Elongation and Modulus of Elasticity of Fiber

The strength and elongation of fiber were measured according to JIS-L-1013.

(4) Storage Elastic Modulus at 180° C.

Measured with a dynamic viscoelasticity measuring apparatus (RheoVibron DDV-01FP, mfd. by ORIENTEC Co., Ltd.) by the use of a sample obtained by tying both ends of a fiber of 30 mm without slack, under the following measuring conditions; frequency: 110 Hz, temperature: 20→260° C., heating rate: 5° C./min, measurement interval: once/° C., amplitude: 16 μm, a single waveform, pre-load: 0.1 g/d.

EXAMPLE 1

An alternating terpolymer of olefins and carbon monoxide having an intrinsic viscosity of 0.5 and represented by the structural formula shown below was used which had been obtained from ethylene, propylene and carbon monoxide by copolymerizing these monomers so that the proportion of propylene units might be 6 mol % based on the total amount of olefin units. The terpolymer was added to a 70 wt % aqueous zinc chloride solution with stirring at 60° C. This polymer was very easily dissolved to give a dope having a polymer concentration of 10 wt %, within a dissolution time of 30 minutes. The solution obtained had a slight tinge of yellow. The dope obtained was immediately poured into a large volume of water and the polymer was recovered in the form of fibrils. The recovered polymer was thoroughly washed with water to be completely freed from zinc chloride, and was dried. The recovered polymer was not different in color from the starting polymer, and its infrared absorption spectrum and NMR spectrum were measured and found to be not different from those of the starting polymer. This fact indicates that the starting polymer is completely soluble in the aqueous zinc chloride solution without decomposition.

A random terpolymer comprising

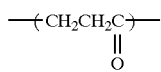

units and

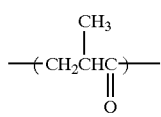

units.

EXAMPLE 2

The same polymer as in Example 1 was added to a 75% aqueous zinc chloride solution with stirring at 70° C. This polymer was very easily dissolved to give a dope having a polymer concentration of 20 wt %, within a dissolution time of 30 minutes. The dope obtained had a slight tinge of yellow. The solution obtained was immediately poured into a large volume of water and the polymer was recovered in the form of fibrils. The recovered polymer was thoroughly washed with water to be completely freed from zinc chloride, and was dried. The recovered polymer was not different in color from the staring polymer, and its infrared absorption spectrum and NMR spectrum were measured and found to be not different from those of the starting polymer. This fact indicates that the starting polymer is completely soluble in the aqueous zinc chloride solution without decomposition.

EXAMPLE 3

An alternating copolymer of ethylene and carbon monoxide (ECO) having an intrinsic viscosity of 2.0 was added to a 75% aqueous zinc chloride solution with stirring at 70° C. This polymer was very easily dissolved to give a dope having a polymer concentration of 15 wt %, within a dissolution time of 30 minutes. The solution obtained had a slight tinge of yellow. The solution obtained was immediately poured into a large volume of water and the polymer was recovered in the form of fibrils. The recovered polymer was thoroughly washed with water to be completely freed from zinc chloride, and was dried. The recovered polymer was not different in color from the starting polymer, and its infrared absorption spectrum and NMR spectrum were measured and found to be not different from those of the starting polymer. This fact indicates that the starting polymer is completely soluble in the aqueous zinc chloride solution without decomposition.

EXAMPLE 4

The solution obtained in Example 3 was passed through a filter of 20 μm, extruded with a plunger extruder having a diameter of spinning hole of 0.5 mm, and passed through baths of a 30% aqueous zinc chloride solution and then a water at a rate of 5 m/min. The resulting non-oriented yarn was stretched at a draw ratio of 7 in an oven at 250° C.

The fiber thus obtained had a strength of 6 g/d and an elongation of 20%.

EXAMPLES 5 TO 10

An alternating terpolymer of ethylene, propylene and carbon monoxide having an intrinsic viscosity of 0.4 was used which had been obtained by copolymerizing these monomers so that the proportion of propylene units might be 10 mol % based on the total amount of olefin units. The terpolymer was dissolved with stirring by employing the composition of solvent, polymer concentration and temperature condition shown in Table 1. Thus, polymer solutions having their respective compositions were obtained within a dissolution time of 30 minutes. Each of the obtained polymer solutions was immediately poured into a large volume of water and the polymer was recovered in the form of fibrils. The recovered polymer was thoroughly washed with water and then dried. The recovered polymer was not different in color from the starting polymer, and its infrared absorption spectrum and NMR spectrum were measured and found to be not different from those of the starting polymer. The intrinsic viscosity of the recovered polymer was also hardly different from that of the starting polymer as shown in Table 1. These facts indicate that the starting polymer was not decomposed and that the aqueous solutions of Examples 5 to 10 can be used as a solvent for the polyketone.

TABLE 1

| Example | Composition of solvent (weight ratio) | Polymer concentration (wt %) | Dissolution temperature (° C.) | Intrinsic viscosity of recovered polymer |
|---|---|---|---|---|
| 5 | Calcium bromide/water = 70/30 | 10 | 80 | 0.4 |
| 6 | Calcium iodide/water = 75/25 | 5 | 90 | 0.4 |
| 7 | Potassium thiocyanate/water = 75/25 | 2 | 110 | 0.38 |
| 8 | Calcium bromide/calcium thiocyanate/water = 65/5/10 | 2 | 100 | 0.39 |
| 9 | Iron chloride/water = 75/25 | 1 | 100 | 0.41 |
| 10 | Calcium bromide/iron bromide/water = 55/20/25 | 1 | 100 | 0.4 |

EXAMPLE 11

An alternating copolymer of ethylene and carbon monoxide (ECO) having an intrinsic viscosity of 4.0 was added to a 75 wt % aqueous calcium bromide solution with stirring at 90° C. This polymer was very easily dissolved to give a dope having a polymer concentration of 10 wt %, within a dissolution time of 30 minutes. The solution obtained was immediately poured into a large volume of water and the polymer was recovered in the form of fibrils. The recovered polymer was thoroughly washed with water to be completely freed from calcium bromide, and was dried. The recovered polymer was not different in color from the starting polymer, and its infrared absorption spectrum and NMR spectrum were measured and found to be not different from those of the starting polymer. The intrinsic viscosity of the recovered polymer was 4.0, namely, it was also hardly different from the intrinsic viscosity of the starting polymer. These facts indicate that the starting polymer is completely soluble in the 75 wt % aqueous calcium bromide solution without decomposition.

EXAMPLE 12

The dope obtained in Example 11 was passed through a filter of 20 μm and then directly extruded into a coagulation bath of a 10 wt % aqueous calcium bromide solution at a rate of 2 m/min through a spinneret having 50 holes with a diameter of 0.1 mm by using a plunger extruder. Then, the extruded product was washed by passage through a water washing bath and wound onto a pipe in a water-containing state. The wound extruded product was placed in a dryer to be subjected to batchwise drying, and the resulting dried yarn was stretched at a draw ratio of 6 in an oven at 240° C. The fiber thus obtained had a strength of 6 g/d and an elongation of 10%.

EXAMPLES 13 TO 22

An alternating copolymer of ethylene and carbon monoxide having an intrinsic viscosity of 7.0 was dissolved in an aqueous solution composed mainly of zinc chloride and having the composition of solvent shown in Table 2, with stirring at a temperature not higher than 80° C. to adjust the polymer concentration to 7 wt %. In all the cases, the dissolution was completed within 30 minutes. Then, the solution viscosity of each of the solutions thus obtained was measured. Each of sodium chloride, calcium chloride, sodium sulfate and barium chloride is soluble in water to a concentration of 1 wt % or more at 50° C. It can be seen that when an aqueous solution containing any of these salts was used as a solvent for the copolymer (Examples 14 to 22), the solution viscosity (measured at 80° C.) was much lower than that attained when none of the salts was used (Example 13). In addition, coloring of the solutions of Examples 14 to 22 did not proceed remarkably even when the solutions were allowed to stand at room temperature. On the other hand, coloring of the solution of Example 13 proceeded to such an extent that the solution became brown after several days. Each of the polymer solutions of Examples 13 to 22 was poured into a large volume of water and thoroughly washed to be completely freed from the metal salt(s), and the polymer was dried. The recovered polymer had an intrinsic viscosity of about 7.0 and its infrared absorption spectrum and NMR spectrum were measured and found to be not different from those of the starting polymer. This fact indicates that the aqueous solution shown in Examples 13 to 22 can be used as a solvent for the polyketone.

EXAMPLE 23

Each of the polyketone solutions of Examples 13 and 14 was extruded through 20 spinning holes with a diameter of 0.16 mm at a discharge linear rate of 6.2 m/min, passed through an air gap of 20 mm in length, passed through a coagulation bath of water as it was and then through a washing bath of 2% sulfuric acid, washed with water, and then wound up. Whichever polyketone solution was used, the fiber wound up contained water about 400 times as much as the polymer. Mechanical properties of the coagulation products thus obtained were measured to find that the coagulation product in the case of Example 13 had a tenacity of 21 g and an elongation of 35%, and the coagulation product in the case of Example 14 a tenacity of 52 g and an elongation of 115%. Thus, the toughness of the coagulation product obtained by using the aqueous solution containing only zinc chloride was low, so that end breakage occurred during spinning. On the other hand, when the polymer solution of Example 14 was used, stable spinning could be achieved without end breakage. When the coagulation product obtained from the polymer solution of Example 14 was dried at 100° C. and then stretched at a ratio of 10 at 215° C., fiber having a high strength of 10 g/d, an elongation of 4% and a high modulus of elasticity of 300 g/d could be obtained. Furthermore, the obtained fiber had a slight tinge of yellow. By contrast, fiber obtained from the polyketone solution of Example 13 in the same manner as above was considerably yellow.

TABLE 2

| Example | Salt added | Composition of solvent (weight ratio) $ZnCl_2$/salt added/water | Solution viscosity (poise) | Color |
|---|---|---|---|---|
| 13 | None | 75/0/25 | 2600 | Light yellow |
| 14 | Sodium chloride | 65/10/25 | 700 | Light yellow |

TABLE 2-continued

| Example | Salt added | Composition of solvent (weight ratio) ZnCl$_2$/salt added/water | Solution viscosity (poise) | Color |
|---|---|---|---|---|
| 15 | Sodium chloride | 60/15/25 | 600 | Light yellow |
| 16 | Sodium chloride | 55/20/25 | 900 | Light yellow |
| 17 | Calcium chloride | 65/10/25 | 900 | Light yellow |
| 18 | Calcium chloride | 60/15/25 | 1400 | Light yellow |
| 19 | Calcium chloride | 57.5/17.5/25 | 1800 | Light yellow |
| 20 | Sodium sulfate | 70/5/25 | 2400 | Light yellow |
| 21 | Barium chloride | 55/20/25 | 900 | Light yellow |
| 22 | Barium chloride | 50/25/25 | 1300 | Light yellow |

REFERENCE EXAMPLE 1

In a 20-liter autoclave were placed 1 liter of methanol and then a catalyst solution prepared by previously stirring 0.141 mmol of palladium acetate, 0.0821 mmol of bis (2-methoxyphenyl)phosphinopropane and 1.333 mmol of trifluoroacetic acid in 10 ml of methanol. Then, a mixed gas containing carbon monoxide and ethylene in a molar ratio of 1:1 was charged into the autoclave, and the reaction was carried out at 80° C. for 3.5 hours while continuously adding the mixed gas so that a pressure of 5 MPa might be maintained.

After completion of the reaction, the pressure was removed and the white polymer thus obtained was repeatedly washed with methanol and then isolated. The amount of the polymer obtained was 73 g. The obtained polyketone was found to be an ECO as a result of nuclear magnetic resonance spectrum and infrared absorption spectrum analyses and the like. The polyketone had an intrinsic viscosity of 5.5 and a Pd content of 41 ppm.

An ECO having an intrinsic viscosity of 5.6 and a Pd content of 105 ppm and an ECO having an intrinsic viscosity of 5.7 and a Pd content of 5 ppm were obtained in the same manner as above except for changing the amount of the catalyst. In these polyketones, substantially no other transition metal element in group VIII than Pd element was detected.

Each of the three polyketones obtained in Reference Example 1 was dissolved in a 65:10:25 (by weight) mixture of zinc chloride, sodium chloride and water to adjust the polymer concentration to 6 wt %. While maintaining the resulting polymer solution at 80° C., the increase of the solution viscosity was measured for 30 hours. Even after the lapse of 30 hours, substantially no viscosity increase was observed in the polymer solutions obtained by using each of the ECOs having Pd contents of 5 ppm and 41 ppm, respectively. However, in the case of the ECO having a Pd content of 105 ppm, the solution viscosity was increased by about 40% after 20 hours of the maintenance and about 100% after 30 hours of the maintenance.

EXAMPLES 24 AND 25

The ECO with an intrinsic viscosity of 5.6 and a Pd content of 41 ppm prepared in Reference Example 1 was dissolved in a 65:10:25 (by weight) mixture of zinc chloride, sodium chloride and water to adjust the polymer concentration to 12 wt %. The resulting solution was discharged through 20 spinning holes with a diameter of 0.16 mm at 80° C., and passed through an air gap of 10 mm, a coagulation bath of 1.2 m composed of water at 10° C., and then a washing bath of 2 m composed of a 2% aqueous sulfuric acid solution. The washed coagulation product was passed through Nelson rolls capable of spraying water continuously, and then passed through a drying line at 240° C., at a definite length. Thereafter, the thus obtained material was subjected to first-stage stretching at 240° C. and then second-stage stretching at 260° C. so as to attain the total draw ratio described in Table 3, by the use of a stretching machine equipped with a hot plate between two feed rolls, and then was wound up. Even when the spinning was conducted continuously for 20 hours, the spinnable properties and the stretchability, in particular, were satisfactory without a change.

The polyketone fibers thus obtained had excellent mechanical properties as shown in Table 3.

The storage elastic modulus at 180° C. was 96 g/d in the case of Example 24 and was 150 g/d in the case of Example 25.

COMPARATIVE EXAMPLE 1

The same experiment in spinning as described in Example 24 was carried out except for using the ECO with an intrinsic viscosity of 5.6 and a Pd content of 105 ppm prepared in Reference Example 1. The spinning could be stably conducted for about 5 hours after the start of the spinning, but end breakage became remarkable after 5 hours of the spinning. It can be speculated that a crosslinked product produced by heat was partially accumulated to hinder the smooth discharge of the polymer solution. The total draw ratio could not be increased to the same total draw ratio as attained in Examples 24 and 25, probably because the crosslinked product produced by heat hindered the stretching. The fiber obtained in Comparative Example 1 had a low elongation, considering its strength lower than that attained in Example 24. The fiber had a storage elastic modulus at 180° C. of 46 g/d.

EXAMPLE 26

The same experiment in spinning as described in Example 24 was carried out except for using the ECO with an intrinsic viscosity of 5.7 and a Pd content of 5 ppm prepared in Reference Example 1. The stretchability was good and physical properties of the resulting fiber were satisfactory.

EXAMPLE 27

The same experiment in spinning as described in Example 24 was carried out by the use of the polymer described in Example 24, except for carrying out passage through warm water at 70° C. in place of the passage through a 2% aqueous sulfuric acid solution. As compared with Examples 24 and 25, the zinc content of the fiber was higher, though substantially the same stretchability was attained.

COMPARATIVE EXAMPLE 2

The same experiment in spinning as described in Example 24 was carried out by the use of the polymer described in Example 24, except for using cold water at 15° C. in place of the 2% aqueous sulfuric acid solution as a liquid used as the washing bath. Zinc could not be sufficiently removed from the fiber obtained, so that the stretchability was deteriorated. Therefore, when the total draw ratio was attempted to be adjusted to 5 or more, end breakage occurred. Table 3 shows physical properties of the fiber wound up after stretching conducted to as high a degree as possible. This fiber had low strength and modulus of elasticity because of the low draw ratio. Its storage elastic modulus at 180° C. was 75 g/d.

EXAMPLE 28

The same spinning process as described in Example 24 was practiced by the use of the polymer obtained in Example 24, except for using an aqueous solution at 10° C. containing 32.5 wt % of zinc chloride and 5 wt % of sodium chloride, in place of the water at 10° C. as a liquid used as the washing bath, and changing the length of the coagulation bath to 4 m. Table 3 shows physical properties of the resulting fiber. The fiber excellent in strength and modulus of elasticity could be stably obtained as in Example 24.

After the spinning was conducted continuously for 5 hours, the coagulation bath was an aqueous solution containing 35 wt % of zinc chloride and 6 wt % of sodium chloride. This coagulation bath was heated at 120° C. to distil off the water, and the residue was boiled down, followed by adding thereto zinc chloride for adjusting the concentration, to obtain an aqueous solution containing zinc chloride, sodium chloride and water in a weight ratio of 65:15:20. The same polymer as used in Example 24 was redissolved in this aqueous solution. Except for using the resulting solution, the experiment in spinning described in Examples 24 and 25 was repeated. As a result, the spinnable properties and stretchability were substantially the same as those attained by the use of the original coagulation bath, and physical properties of the resulting fiber were not different from those of the fiber obtained by using the original coagulation bath. This fact indicates that the solvent used in the present invention is excellent in recoverability.

EXAMPLE 29

Fiber of 1500 d/750 f obtained by the same process as in Example 26 was doubled and twisted at 390 T/m each for first twist and final twist to obtain raw cord. RFL having a resin content of 20% was adhered to the raw cord, after which the raw cord was passed through dryers at 130° C. and 225° C., respectively, so as to have a content of the adhered resin of 5 wt %. Using the tire cord thus obtained, a radial-ply tire was produced.

The thus obtained radial-ply tire was turned in contact with an asphalt surface at 35° C. in the same manner as in the running at 200 km/hr of a passenger car with a weight of 1 t, while applying to the asphalt surface the same contact pressure as that applied by the passenger car running at 200 km/hr. The turning was continued for 96 hours to carry out a turning test.

After 96 hours of the turning, the tire cord was taken out of the tire and its retention of strength was measured. When the polyketone fiber of Example 26 was used, the strength of the tire cord after the test was hardly lower than that after the RFL treatment. For comparison, the same experiment as above was carried out except for using the polyketone fiber of Comparative Example 1, to find that the strength of the tire cord after the experiment was about 6% lower than that before the experiment.

EXAMPLE 30

Fiber of 1500 d/750 f obtained in the same manner as in Example 26 was cut into short fibers of 50 mm. Two parts by weight of the short fibers, 3 parts by weight of pulp, 57 parts by weight of Portland cement and 38 parts by weight of silica were mixed, subjected to wet paper-making, and then molded into a slate at 120° C. in an autoclave. The thus obtained slate had an excellent strength and its section was observed to find that the polyketone fiber had been uniformly dispersed. The solution viscosity of the polyketone fiber taken out of the slate was measured to find no viscosity decrease. However, the same experiment as above was carried out for comparison, except for using the polyketone fiber of Comparative Example 1, to find that the viscosity of the polyketone fiber after the experiment was about 12% lower than that before the experiment. It is conjectured that this viscosity decrease was caused in the autoclave molding step.

EXAMPLE 31

The polyketone fiber of Example 24 was doubled and twisted at 390 T/m each for first twist and final twist to obtain raw cord. An epoxy resin was adhered to the raw cord, after which the raw cord was passed through a dryer at 230° C. so as to have a content of the adhered resin of 5 wt %. Using the resulting treated cord, a B type cogged V-belt of 1,016 mm in length composed of upper canvas, a compressed rubber layer of chloroprene rubber and lower canvas was produced according to a conventional process. The V-belt was led through two pulleys and rotated at 2,000 rpm for 24 hours. After the experiment, the polyketone fiver was taken out of the V-belt and its strength was measured and found to be hardly lower than that after the epoxy resin treatment. For comparison, the same experiment as above was carried out except for using the polyketone fiber of Comparative Example 1, to find that the strength of the polyketone fiber after the experiment was about 15% lower than that before the experiment.

TABLE 3

| Example | Pd content of fiber after spinning (ppm) | Zn content of fiber after spinning (ppm) | Total draw ratio (times) | Strength (g/d) | Elongation (%) | Modulus of elasticity (g/d) |
| --- | --- | --- | --- | --- | --- | --- |
| 24 | 37 | 70 | 12.6 | 11.4 | 5.6 | 146 |
| 25 | 37 | 72 | 14.6 | 13.2 | 4.0 | 312 |
| 26 | 4 | 32 | 14.1 | 12.8 | 4.1 | 280 |
| 27 | 38 | 2400 | 12.1 | 10.3 | 5.3 | 140 |
| 28 | 35 | 106 | 12.5 | 11.1 | 5.5 | 145 |

TABLE 3-continued

|  | Pd content of fiber after spinning (ppm) | Zn content of fiber after spinning (ppm) | Total draw ratio (times) | Strength (g/d) | Elongation (%) | Modulus of elasticity (g/d) |
|---|---|---|---|---|---|---|
| Comparative Example |  |  |  |  |  |  |
| 1 | 102 | 68 | 9.2 | 9.1 | 5.1 | 112 |
| 2 | 35 | 15000 | 4.5 | 4.2 | 5.2 | 72 |

EXAMPLE 32

In an autoclave were placed 0.33 mmol of bis(cyclooctadiene)nickel(0), 0.33 mmol of 2-mercapto-benzoic acid and 2 mols of toluene, and a mixed gas containing carbon monoxide and ethylene in a molar ratio of 1:1 was charged into the autoclave, after which polymerization was carried out at 5 MPa and 80° C. for 15 hours. The resulting polyketone was thoroughly washed with acetone to obtain an alternating copolymer of ethylene and carbon monoxide (ECO) having an intrinsic viscosity of 4.2 and a nickel content of 12 ppm and containing substantially none of palladium and cobalt.

This polyketone was subjected to wet spinning in the same manner as in Example 24. The resulting fiber contained 10 ppm of nickel and 300 ppm of zinc and had a strength of 10.2 g/d and an elongation of 4%.

EXAMPLE 33

The process of Reference Example 1 and Example 24 was repeated except for using cobalt acetate in place of palladium acetate. From the resulting polyketone, an alternating copolymer of ethylene and carbon monoxide (ECO) having an intrinsic viscosity of 3.0 and a cobalt content of 41 ppm and containing substantially none of palladium and nickel was obtained.

This polyketone was subjected to wet spinning in the same manner as in Example 24. The resulting fiber contained 57 ppm of cobalt and 512 ppm of zinc and had a strength of 7.2 g/d and an elongation of 4%.

EXAMPLE 34

An alternating copolymer of ethylene and carbon monoxide (ECO) having an intrinsic viscosity of 6.0 was added to an aqueous solution containing 25% zinc chloride and 40% calcium chloride, with stirring at 100° C. The polymer was very easily dissolved to give a solution having a polymer concentration of 3 wt %. The obtained solution was transparent. The obtained solution was immediately poured into a large volume of water and the polymer was recovered in the form of fibrils. The recovered polymer was thoroughly washed with water to be completely freed from zinc chloride and calcium chloride, and was dried. The recovered polymer was not different in color from the starting polymer, and its infrared absorption spectrum and NMR spectrum were measured and found to be not different from those of the starting polymer. This fact indicates that the starting polymer is completely soluble in the above-mentioned aqueous solution without decomposition.

INDUSTRIAL APPLICABILITY

The present invention provides a polyketone solution that has a low toxicity, is excellent in incombustibity, spinning stability and solvent recoverability, and is inexpensive and industrially very useful, a wet spinning process using said solution, and fiber obtained by said process. The polyketone fiber obtained according to the present invention is excellent in strength, modulus of elasticity, durability and adhesive properties and hence can be used not only in industrial materials such as tire cords, belts, radiator hoses, sling belts, sewing yarns, ropes and cement-reinforcing materials, but also in common clothing items, films and the like.

What is claimed is:

1. A solution of a polyketone, comprising a polyketone as a copolymer of carbon monoxide and one or more olefins, wherein 90 wt % or more of said copolymer is represented by the structural formula (1):

wherein A is an alkylene group and n is an integer of 1 or more and a solvent, wherein said solvent is an aqueous solution of at least one member selected from the group consisting of calcium salts, and iron salts.

2. A solution according to claim 1, wherein the concentration of the calcium salt(s) and/or iron salt(s) in said solvent is 5 to 85 wt %, and the polyketone concentration is 0.005 to 70 wt %.

3. A solution according to claim 1, wherein the anion portion of each of the calcium salt(s) and/or iron salt(s) is a halide.

4. A solution according to claim 1, wherein said solvent is an aqueous solution that also contains at least one zinc halide and optionally one or more metal halides selected from the group consisting of sodium chloride, lithium chloride, barium chloride, sodium bromide, calcium bromide, lithium bromide, barium bromide, sodium iodide, calcium iodide, lithium iodide and barium iodide, and wherein a weight ratio of said at least one zinc halide to said at least one member selected from the group consisting of calcium salts and iron salts and said at one or more metal halides is 98/2 to 20/80, a concentration of the at least one zinc halide in the solvent is 20 to 70 wt % and the concentration of the polyketone in the solution is 0.005 to 70 wt %.

* * * * *